(12) United States Patent
Lockwood et al.

(10) Patent No.: US 7,018,542 B2
(45) Date of Patent: Mar. 28, 2006

(54) METHOD FOR REMOVING HEAVY METALS AND RADIONUCLIDES FROM AN AQUEOUS SOLUTION

(75) Inventors: James M. Lockwood, Overland Park, KS (US); Fred H. Green, Paola, KS (US)

(73) Assignee: Eureka Technology, LLC, Paola, KS (US)

( * ) Notice: Subject to any disclaimer, the term of this patent is extended or adjusted under 35 U.S.C. 154(b) by 34 days.

(21) Appl. No.: 10/424,308

(22) Filed: Apr. 28, 2003

(65) Prior Publication Data

US 2004/0069712 A1 Apr. 15, 2004

Related U.S. Application Data

(63) Continuation-in-part of application No. 10/271,703, filed on Oct. 15, 2002, now Pat. No. 6,827,859.

(51) Int. Cl.
*C02F 1/42* (2006.01)
*B01J 29/04* (2006.01)

(52) U.S. Cl. .................... 210/682; 210/688; 502/85
(58) Field of Classification Search ................ 210/681, 210/682, 688; 502/85, 86
See application file for complete search history.

(56) References Cited

U.S. PATENT DOCUMENTS

| | | |
|---|---|---|
| 4,247,524 A | 1/1981 | Leonard |
| 4,623,529 A | 11/1986 | Sanders et al. |
| 5,268,107 A | 12/1993 | Hutchings et al. |
| 5,690,833 A | 11/1997 | Crawford et al. |
| 5,919,287 A | 7/1999 | Moreau |
| 6,218,329 B1 | 4/2001 | Singh et al. |
| 6,261,986 B1 | 7/2001 | Bowman et al. |
| 6,413,492 B1 | 7/2002 | Kuznicki et al. |

*Primary Examiner*—Robert A. Hopkins
(74) *Attorney, Agent, or Firm*—Lathrop & Gage LC

(57) ABSTRACT

A solid ion-exchange material useful for removing heavy metals or radionuclides from an aqueous solution comprising a modified clinoptilolite, and methods of using same are provided.

8 Claims, No Drawings

METHOD FOR REMOVING HEAVY METALS AND RADIONUCLIDES FROM AN AQUEOUS SOLUTION

RELATED U.S. APPLICATION

This application is a Continuation-In-Part of patent application Ser. No. 10/271,703, entitled "Method for Removing Heavy Metals and Radionuclides from an Aqueous Solution," filed Oct. 15, 2002 now U.S. Pat. No. 6,827,859 and is incorporated herein by reference.

FIELD OF INVENTION

The present invention relates to novel solid and liquid ion-exchange materials useful for removing heavy metals or radionuclides from an aqueous solution and a process for producing the ion exchange materials thereof. The present invention further relates to a method for removing heavy metals or radionuclides from an aqueous solution using the ion exchange materials of the invention. In one aspect, the invention relates to use of solid ion exchange materials, liquid ion exchange materials, and mixtures thereof useful in said method.

BACKGROUND OF INVENTION

A significant amount of industrial waste water is contaminated with heavy metals such as lead, zinc, copper, antimony, chromium and nickel and radioisotope ions such as radioisotopes of uranium, cobalt, thorium, strontium and cesium. These metals become contaminants in aqueous systems as the result of activities including chemical manufacture, smelting, electroplating, wood treating, industrial and medical use of radioisotopes, etc. When such metals are used, metal discharges in aqueous streams severely damage the environment by posing risk to wild life and human health, and have become a worldwide environmental concern. The successful treatment of low level radioactive effluent also presents a major challenge to the nuclear industry. Therefore, improved methods for removing heavy metals or radioactive isotope ions rapidly and efficiently from contaminated industrial aqueous solutions are highly desired.

Existing metal removal methods include standard, conventional techniques such as evaporation, precipitation, electrolytic techniques, membrane separation, fixed and movable bed ion exchange, and activated carbon purification. However, these methods are not economical or efficient enough in most cases. Zeolites and organically modified smectite clays have also been used in these applications, but there remains a continual need to develop improved materials that are more effective for removal of heavy metals and radioisotopes.

Previous studies have identified natural zeolites, e.g. naturally occurring clinoptilolite, for use in removing heavy metals and radioisotope ions from aqueous solutions. While natural zeolites have been used, they are not sufficiently cost-effective and efficient in removing heavy metals and radioisotope ions.

It has been suggested to use modified zeolites to improve the metal removal efficiency of the natural zeolites. U.S. Pat. No. 5,268,107 (the '107 patent) describes a modified clinoptilolite as an ion exchange material for the removal of radioisotope cations such as the cations of cesium ($^{137}$Cs) and strontium ($^{90}$Sr) from an aqueous environment containing radioisotope cations. The modified clinoptilolite of the '107 patent is produced by treating a natural clinoptilolite with sodium hydroxide at a concentration of 0.1 to 5M or with hydrochloric acid at a concentration of from 0.1 to 5M for a treatment time longer than one hour at a temperature of 30° C. to 80° C. The modified clinoptilolite is preferably calcined at a suitable calcining temperature of from 400° C. to 500° C. for a calcining time of at least 3 hours. While the modified clinoptilolite of the '107 patent is improved over unmodified clinoptilolite, it is still desired to have further improvement in the heavy metal or radioisotope ion removal efficiency to have a more commercially attractive product. Applicants have now discovered an improved modified clinoptilolite based ion exchange materials with improved heavy metal and radioisotope ion removal efficiency.

SUMMARY OF INVENTION

According to the invention, a solid ion-exchange material useful for removing heavy metals and/or radionuclides from an aqueous solution is provided comprising a modified clinoptilolite having a silicon/aluminum (Si/Al) concentration ratio about 1:1 to about 4:1 and a Na concentration of about 20,000 mg/kg to about 140,000 mg/kg. As used herein, the Si/Al concentration ratio means the molar ratio of the silicon atoms versus the aluminum atoms in the solid ion-exchange material. A liquid ion-exchange material useful for removing heavy metals and/or radionuclides from an aqueous solution is also provided comprising: a) about 2,500 mg/L to about 50,000 mg/L Si; b) about 60 mg/L to about 1,200 mg/L Al; and c) about 10,000 mg/L to about 200,000 mg/L total hydroxide ion.

Further according to the invention, a process for preparing an ion exchange material useful for removing heavy metals or radionuclides from an aqueous solution is provided comprising contacting clinoptilolite with an alkaline solution at a temperature of about 85° C. to about 300° C. and for a sufficient time to form a treated slurry comprising an ion exchange material having a solid fraction and a liquid fraction. The solid ion exchange material is further processed by separating the solid fraction from the treated slurry and washing the solid fraction. The liquid ion exchange material is further processed by recovering the liquid fraction from the treated slurry. A mixture of the solid ion exchange material and the liquid ion exchange material that can be used to remove heavy metals or radionuclides from an aqueous solution can be the treated slurry directly produced, or alternatively, can be prepared by mixing the solid ion exchange material with the liquid ion exchange material.

Still further according to the invention, a method for removal of heavy metals or radionuclides from a contaminated aqueous solution is provided comprising contacting the contaminated aqueous solution with an ion exchange material selected from a solid ion exchange material, a liquid ion exchange material, or mixtures thereof, wherein the ion exchange material is prepared according to the process of the invention.

BRIEF DESCRIPTION OF THE DRAWINGS

Not Applicable.

DETAILED DESCRIPTION OF THE INVENTION

As used herein, heavy metals (HMs) are all metals in groups 2 to 16 of the periodic table including the lanthanide and actinide series metals (using current IUPAC notation for the periodic table), and the semi-metallic elements boron, arsenic, selenium, and tellurium. Examples of HMs include, but are not limited to, lead, zinc, copper, antimony, chromium and nickel. As used herein, radionuclides or radioactive nuclides (Rads) are radioisotopes of all elements. Examples of Rads include, radioisotopes of uranium, cobalt, thorium, strontium and cesium.

According to one aspect of the invention, there is provided a solid ion-exchange material useful for removing HMs or Rads from an aqueous solution comprising a modified clinoptilolite having: a) a Si/Al concentration ratio of about 1:1 to about 4:1; and b) a sodium concentration of about 20,000 mg/kg to about 140,000 mg/kg. The solid ion-exchange material may also comprise Ca, with concentration of about 15000 mg/kg to about 30000 mg/kg. The solid ion-exchange material may further comprise K, with concentration of about 5000 mg/kg to about 20000 mg/kg. The solid ion-exchange material may additionally comprise Mg, with concentration of about 2500 mg/kg to about 10000 mg/kg; and Ti, with concentration from about 1000 mg/kg to about 3000 mg/kg. The Si/Al ratio and metal ion concentrations of the ion exchange material are determined using ICP-AES (ICP=Inductively Coupled Plasma and AES=atomic emission spectroscopy). The Si/Al ratio and sodium concentration of the ion exchange material are determined using ICP-AES (ICP=Inductively Coupled Plasma and AES=atomic emission spectroscopy). Preferably, the Si/Al concentration ratio is about 1:1 to about 3:1, and more preferably about 1.5:1 to about 3:1. The sodium concentration is preferably about 40,000 to about 100,000 mg/kg, and more preferably about 50,000 to about 80,000 mg/kg.

Although not to be bound by theory, it is believed that a decrease of the Si/Al ratio and an increased sodium content contributes to the improved performance of the modified clinoptilolite compared to the naturally occurring clinoptilolite.

There is also provided a liquid ion-exchange material useful for removing HMs or Rads from an aqueous solution comprising: a) about 2,500 mg/L to about 50,000 mg/L Si; b) about 60 mg/L to about 1200 mg/L Al; and c) about 10,000 mg/L to about 200,000 mg/L total hydroxide ion; wherein the Si and Al concentration are determined using ICP-AES. The Si concentration is preferably to be about 10,000 to about 40,000 mg/L, and more preferably about 20,000 to about 30,000 mg/L. The Al concentration is preferably to be about 200 to about 1,000 mg/L, and more preferably about 300 to about 700 mg/L. The total hydroxide concentration is preferably about 50,000 to about 150,000 mg/L, and more preferably about 75,000 to about 125,000 mg/L. As used herein, "total hydroxide concentration" is the concentration of hydroxide present as alkali metal, alkaline earth metal hydroxide ions, or other alkaline compounds as employed by the invention. According to another aspect of the invention, there is provided a method for removing HMs or Rads from an aqueous solution comprising contacting the aqueous solution with an ion exchange material selected from a solid ion exchange material, a liquid ion exchange material, or mixtures thereof, wherein the ion exchange material is prepared by the process comprising: (a) contacting clinoptilolite with an alkaline solution at a temperature of about 85° C. to about 300° C. and for a sufficient time to form a treated slurry comprising a solid fraction and a liquid fraction; and optionally, (b) separating the solid fraction from the treated slurry and washing the solid fraction to produce the solid ion exchange material, and (c) recovering the liquid fraction of the treated slurry from step (b) to produce the liquid ion exchange material.

According to another aspect of the invention, there is provided a process for producing an ion exchange material useful for removing HMs or Rads from an aqueous solution comprising contacting clinoptilolite with an alkaline solution at a temperature of about 85° C. to about 300° C. and for a sufficient time to form a treated slurry comprising the ion exchange material comprising a solid fraction and a liquid fraction. The treated slurry comprising the mixture of the solid fraction and the liquid fraction can be used as the ion exchange material in the method of the invention for removing heavy metals or radionuclides from the aqueous solution. In the alternative, the solid and liquid fractions can be recovered to produce the solid ion exchange material and the liquid ion exchange material.

In one embodiment of the invention, the ion exchange material is a solid ion exchange material that is obtained by separating the solid fraction from the treated slurry and washing the solid fraction. The separation of the solid fraction from the treated slurry can be done by any conventional method known to those skilled in the art. For example, the solid fraction can be separated using filtration. The recovered solid fraction is then washed or rinsed, preferably with water or a dilute alkaline solution, to produce the solid ion exchange material. The washing can be done by any conventional means known to those skilled in the art. For example, the recovered solid fraction can be rinsed on the separation apparatus or it can be reslurried and refiltered.

The washing of the solid fraction can be conducted at ambient temperature or at an elevated temperature. It is currently preferred to conduct the washing at a temperature of about 25° C. to about 100° C., preferably at a temperature of about 80° C. to about 100° C., with a temperature of about 100° C. being most preferable. The solids can then be dried at ambient temperature or dried at an elevated temperature to decrease the drying time. The process of the invention produces a solid ion exchange material having substantially increased the ion exchange capacity compared to an untreated clinoptilolite or a clinoptilolite treated according to the process of the '107 patent. The solid ion exchange material of the invention is referred to herein as S200.

While not limited thereto, the solid ion exchange material of the invention does not require a calcining step, i.e. heating at an elevated temperature such as >400° C., prior to use in removal of HMs or Rads from an aqueous solution.

In another embodiment of the invention, the ion exchange material is a liquid ion exchange material that is obtained by recovering the liquid fraction of the treated slurry, i.e. the mother liquor of the separation step used to recover the solid fraction. The liquid fraction recovered is a liquid ion exchange material that is useful for removing heavy metals or radionuclides from an aqueous solution. The liquid ion exchange material of the invention is referred to herein as S200L.

The solid ion exchange material and the liquid ion exchange material can be used individually in the method of the invention for removing HMs or Rads from the aqueous solution. In the alternative, the recovered solid ion exchange material and the recovered liquid ion exchange material can be mixed to form an ion exchange material for use in the method of the invention for removing heavy metals or radionuclides from the aqueous solution.

The alkaline compounds in the alkaline solution that can be employed in the process of the invention are selected from alkali metal hydroxides, alkaline earth metal hydroxides, ammonium hydroxide, tetraalkylammonium hydroxides, or mixtures thereof.

Examples of suitable alkali metal hydroxides include lithium hydroxide, sodium hydroxide, and potassium hydroxide, with sodium hydroxide and potassium hydroxide currently being preferred, and sodium hydroxide currently being most preferred.

Examples of suitable alkaline earth metal hydroxides include magnesium hydroxide and calcium hydroxide.

The alkyl groups of the tetraalkylammonium hydroxides can independently be the same or different, and are alkyl groups having 1 to about 8 carbon atoms, preferably 1 to about 4 carbon atoms. Examples of suitable tetraalkylammonium hydroxides include tetramethylammonium hydroxide, tetrabutylammonium hydroxide, and the like.

The currently preferred alkaline compounds are the alkali metal hydroxides, with sodium hydroxide or potassium hydroxide being more preferred, and sodium hydroxide being most preferred.

The alkaline solution for use in the invention has a concentration of about 0.5M or greater, preferably about 0.5M to about 10M, and more preferably about 2.5M to about 5M.

The ratio of clinoptilolite to alkaline solution in the slurry will depend on the particular alkaline compound used and the concentration of the alkaline solution. The ratio of clinoptilolite to alkaline solution in the slurry will be readily apparent to those of ordinary skill in the art without undue experimentation. Typically, the ratio of clinoptilolite to alkaline solution in the slurry is about 5 to about 50 grams clinoptilolite per 100 mL of alkaline solution.

The process of the invention for preparing the ion exchange material can be conducted at a temperature of about 85° C. to about 300° C., preferably about 85° C. to about 150° C., and more preferably about 100° C. to about 125° C. The process of the invention for preparing the ion exchange material can be conducted at any suitable pressure based on the temperature, alkaline compound and alkaline solution concentration used. It is currently preferred to conduct the process for preparing the ion exchange materials of the invention at a pressure of atmospheric to about 750 psig, with a range of about 20 to about 50 psig being more preferred. The treatment time in the process of the invention for preparing the ion exchange material is the time sufficient to prepare the ion exchange material(s) of the invention and will depend on the temperature, alkaline compound, alkaline solution concentration, and pressure used. Typically, the treatment time is about 0.5 hour to about 4 hours, with about 1 hour to about 2 hours being preferred. Process operating conditions such as treatment time, pressure and temperature can be altered by use of an alternative energy source such as microwave energy. For example, required treatment time can be substantially reduced by operating at higher temperature and pressure.

In a further preferred embodiment of the process of the invention for producing the ion exchange material (including the solid ion exchange material and the liquid ion exchange material), the ion exchange material is not produced using added sodium aluminate.

Removal of HMs or Rads from an aqueous solution with the use of solid ion exchange material, i.e. S200, can be achieved by contacting the contaminated aqueous solution with the solid ion exchange material in any conventional method known to those skilled in the art. For example, the contaminated aqueous solution can be passed through a bed or column containing the solid ion exchange material. In the alternative, a batchwise method can be used by charging the solid ion exchange material into a volume of contaminated aqueous solution, agitating for a sufficient period of time, and conducting a liquid/solid separation to remove solids. The contacting time of the solid ion exchange material with an aqueous solution containing HMs or Rads is a time sufficient to remove the desired amount of heavy metals or radionuclides from the aqueous solution. The currently preferred contacting time is about 30 minutes to about 24 hours. The solid ion exchange material of the invention can be used with either a basic or acidic contaminated aqueous solution. The amount of solid ion exchange material to be contacted with the contaminated aqueous solution will depend on the volume, contaminant level, and pH of the contaminated aqueous solution. The amount can be readily determined by one of ordinary skill in the art without undue experimentation.

Removal of HMs or Rads with liquid ion exchange material, i.e. S200L, can be achieved by contacting the contaminated aqueous solution with the liquid ion exchange material in any conventional method known to those skilled in the art. For example, the liquid ion exchange material can be directly contacted with the contaminated aqueous solution in an agitated vessel. While not wishing to be bound by theory, it is believed that the contaminants will precipitate from the solution as well as aluminosilicates from the liquid ion exchange material. The contaminants are believed to be ionically bound to and/or encapsulated with the aluminosilicates present in the liquid ion exchange material and sequestered in the precipitate. A liquid/solid separation is then conducted to remove the precipitated contaminants from the solution. The precipitate is not leachable and non-hazardous by definition of Environmental Protection Agency (EPA) test method 1311, "toxic characteristic leach procedure". The contaminated aqueous solution is preferably acidic when treatment is conducted with the liquid ion exchange material of the invention. The amount of liquid ion exchange material to be contacted with the contaminated aqueous solution will depend on the volume, contaminant level, and pH of the contaminated aqueous solution. The amount will be readily determined by one of ordinary skill in the art without undue experimentation.

When the contaminated aqueous solution is contacted with the liquid ion exchange material of the invention and the precipitated contaminants removed, the pH of the treated aqueous solution is preferably about 6 to about 10.

In another embodiment of the invention, the ion exchange material is a mixture of S200 and S200L. The mixture of S200 and S200L can be produced by using the treated slurry directly or by mixing the S200 and S200L. Removal of HMs and Rads from an aqueous solution can be achieved by contacting the mixture with the contaminated aqueous solution for a sufficient time so that the metal ions are either bound to the solid S200 or precipitate from the aqueous solution. A liquid/solid separation is then conducted to remove the solids from the solution as described above.

In a further preferred embodiment of the method of the invention for removal of HMs or Rads from a contaminated aqueous solution, the ion exchange material does not contain added sodium aluminate.

The following examples are exemplary of the methods/processes of the invention.

EXAMPLES

Example 1

A slurry comprising 500 mL of 5M NaOH solution and 150 g of a naturally occurring clinoptilolite [Zeotech Corporation, from a deposit located near Tilden, Tex. were placed in a one liter stainless steel reactor. The reactor was then sealed and the contents brought to a temperature of 110° C. This temperature was maintained for 2 hours at a pressure of 25 psig. The slurry was agitated throughout the entire treatment. At the end of 2 hours, the slurry was removed from the reactor and filtered resulting into a liquid fraction (S200L) and a solid fraction (S200). The solid fraction was rinsed with 200 mL of 100° C. deionized water. The slurry was again filtered using a vacuum filtration system utilizing a Whatman 542 (2.74 μpore size) filter paper.

Example 2

0.5 g of S200 prepared according to Example 1 was placed in a resin column [2.5 cm dia.×20 cm borosilicate resin column manufactured by Kontes Glass Company and purchased from Fisher Scientific]. 150 mL of an aqueous solution containing 200 ppm lead was passed through the column. Analysis of the treated solution showed the removal of 99.9% of the lead.

Example 3

A wastewater sample was obtained from a commercial metal finishing plant. Analysis showed the sample to have a zinc concentration of 200 ppm. The pH of the solution was 3.6. 100 mL of the solution was placed in a container with 0.5 g of S200 prepared according to Example 1, agitated for 30 minutes and filtered. Analysis of the filtrate showed the zinc concentration to be 0.15 ppm or that over 99.9% of the zinc had been removed.

Example 4

A 200 mL aqueous solution containing 100 ppm cobalt and 100 ppm antimony was placed in a container with 1.0 g of S200 prepared according to Example 1 and agitated for 24 hours. Samples were pulled at intervals of 30 minutes, 2.5 hours, 12 hours, and 24 hours. Analysis of the sample pulled at the 30-minute interval showed that the cobalt concentration was 0.1 ppm and the antimony concentration was 35 ppm, or a 99.9% and 65% removal respectively. These concentrations remained consistent throughout the course of the 24 hour experiment.

Example 5

A wastewater was obtained from a commercial metal finishing plant. Analysis showed the copper concentration to be 1750 ppm and the pH to be 1.0. 100 mL of the solution was placed in a container. 15 mL of S200L prepared according to Example 1 was gradually added to the solution, while stirring constantly. A precipitate formed immediately and continued forming throughout the addition of S200L. After the entire 15 mL had been added, the pH of the solution had risen to 9. The solution was then filtered. Analysis of the filtrate showed the copper concentration had been reduced to 1.4 ppm, i.e. a 99.9% removal of the copper.

Example 6

Example 5 was repeated, except a 100 mL aqueous solution with a pH value of 1 and a lead concentration of 1000 ppm was used. Again 15 mL of S200L prepared according to Example 1 was added, a precipitate formed and the pH raised to 9. The solution was filtered. Analysis of the filtrate showed the lead concentration to be 0.1 ppm, meaning nearly all the 100 mg of lead in the solution had been sequestered in the precipitate. The precipitate was dried for 16 hours at a temperature of 105° C. The dry solid was subjected to a toxic characteristic leach procedure (EPA test method #1311). The extraction solution was analyzed showing the lead concentration to be 0.2 ppm or well under the 5 ppm level needed to be in compliance with EPA guidelines for disposal of solid waste. Therefore, the precipitate is considered to be non-leachable and non-hazardous.

The solid ion exchange material of the present invention, namely S200, shows tendency to remove HMs and Rads from an aqueous solution more rapidly and efficiently than natural clinoptilolites, other commercially available ion-exchange materials, and the modified clinoptilolites disclosed by the '107 patent. The following examples are exemplary of the comparison study.

Example 7

S200 prepared according to Example 1 and a naturally occurring clinoptilolite [Zeotech Corporation, from a deposit located near Tilden, Tex. were tested in duplicate under identical conditions. 0.5 g of each material was placed in beakers containing 100 mL of a 2000 ppm lead solution. The aqueous solutions were at a pH of 6.3 and a temperature of 25° C. Solutions were agitated for 30 minutes and then filtered. The filtrates were analyzed by atomic absorption spectroscopy. The average result for the clinoptilolite was a removal of 12.5% of the lead or 25 mg. The average result for the S200 was a removal of 80% of the lead or 160 mg, showing greater than a 6 fold increase over the naturally occurring clinoptilolite in load capacity for lead.

Example 8

S200 prepared according to Example 1, Chabazite (GSA Resource's Cabsorb ZS500RW chabazite zeolite for the removal of radionuclides), and R&H IRC748 (Rohm & Haas Amberlite IRC748, a resin for the removal of heavy metals) were tested in triplicate under identical conditions. 1.5 g of each material (except the sample of IRC 748 which was 3.75 g) was placed in beakers containing 150 mL of a 100 ppm antimony and 100 ppm cobalt aqueous solution. The solutions were at a pH of 6.9 and a temperature of 25° C. Samples were taken at 0.5, 2.5, 4, 12, and 24 hours. The average percentage for the targeted removal of antimony and cobalt is shown below in Table 1 and Table 2, respectively.

TABLE 1

| Targeted Antimony Removal (as percent removed) | | | | | | |
|---|---|---|---|---|---|---|
| Time [hour] | 0 | 0.5 | 2.5 | 4 | 12 | 24 |
| S200 | 0% | 61% | 62% | 62% | 65% | 67% |
| Chabazite | 0% | 20% | 26% | 28% | 48% | 51% |
| R & H IRC748 | 0% | 11% | 22% | 22% | 22% | 23% |

TABLE 2

| Targeted Cobalt Removal (as percent removed) | | | | | | |
|---|---|---|---|---|---|---|
| Time [hour] | 0 | 0.5 | 2.5 | 4 | 12 | 24 |
| S200 | 0% | 100% | 100% | 99% | 100% | 98% |
| R & H IRC748 | 0% | 58% | 60% | 64% | 85% | 89% |
| Chabazite | 0% | 0% | 0% | 0% | 8% | 5% |

As can be seen, analysis of the sample pulled at the 30-minute interval showed a 61% removal of antimony by S200, a 3-fold greater efficiency than Chabazite, and about a 6-fold greater efficiency than IRC748. After 24 hours, the removal of antimony by S200 was still significantly better than for either the Chabazite or the IRC748. In addition, analysis of the sample pulled at the 30-minute interval showed a 100% removal of cobalt by S200, a 1.7-fold greater efficiency than IRC748 and compared to no removal by Chabazite. After 24 hours, the removal of cobalt by S200 (98%) was still significantly better than IRC748 whereas removal by Chabazite was still less than 10%.

Example 9

Modified clinoptilolite was prepared according to the conditions described in the '107 patent. 50 g clinoptilolite was treated in 500 mL of 2M NaOH solution stirred at 50° C. for 8 hours, filtered using a Whatman 542 (2.7 μ pore size) filter paper, then rinsed with deionized water, dried and homogenized. 100 mL of an aqueous solution containing 100 ppm cobalt was placed in separate containers, one with 0.5 g of S200 prepared according to Example 1 and one with 0.5 g of the modified clinoptilolite of Example 9, and the samples agitated for 2 hours. Samples were pulled at intervals of 0.5 hour, 1 hour, and 2 hours. The results are shown in Table 3.

TABLE 3

Targeted Cobalt Removal (as percent removed)

| Time [hour] | 0 | 0.5 | 1.0 | 2.0 |
|---|---|---|---|---|
| S200 | 0% | 99.7% | 99.7% | 99.7% |
| Patent'107 | 0% | 65.0% | 75.0% | 85.0% |

As can be seen, a removal of 99.7% cobalt by S200 was reached within 30 minutes, while a removal of only 85% cobalt was reached by the modified clinoptilolites of the '107 patent after two hours. Therefore, S200 of the present invention showed an unexpected and significantly higher ion exchange capacity than the product of the '107 patent.

A similar study was conducted using lead instead of cobalt. The material produced by replicating the '107 patent process was run in triplicate, as was the S200 material, under identical conditions. 0.5 g of each material was placed in containers with 100 mL of a solution containing 2000 ppm lead and agitated for 2 hours. Samples were pulled at intervals of 0.5, 1, and 2 hours. Analysis showed the samples were fully loaded after 0.5 hours as concentrations remained consistent at 1 and 2 hours. The removal of lead is referred to as capacity as the samples were intentionally overloaded as a means of determining load capacity.

S200 had twice the capacity for removal of lead than the product of the '107 patent (150 mg versus 75 mg). Therefore, S200 of the present invention showed an unexpected and significantly higher load capacity for removing lead than the product of the '107 patent. In addition, the efficiency of lead removal by S200 is greater than 99% up to its load capacity.

Example 10

Elementary Study for Solid Ion-Exchange Materials:

A fusion procedure was used to dissolve modified clinoptilolite of the invention (S200) and unprocessed, naturally occurring clinoptilolite. Samples were run in triplicate. 0.1 g sample of solid ion-exchange material (S200) as prepared according to the procedure of Example 1, and naturally occurring clinoptilolite were each mixed with 0.5 g of lithium metaborate (from SPEX Certiprep New Jersey, USA) in a weighing boat. The mixture was transferred into a clean graphite crucible and fused in a muffle furnace at 1000° C. for 30 minutes. The crucible was removed and the molten mass was poured directly into a clean Teflon™ beaker containing 50 mL of 0.8M nitric acid. The contents of the beaker were accurately weighed before and after the addition of the molten sample and the mixture was transferred to a 125 mL screw-capped polypropylene bottle and made up to 100 ml by the addition of 0.8M nitric acid. The bottle containing the suspension was placed in a sonic bath until all solids dissolved, resulting in a clear solution. The samples were analyzed using the instrumentation described below and the results are given below. As shown by the experimental results, the Si/Al concentration ratio in the solid ion-exchange material is about 2.7:1, compared to the Si/Al concentration ratio 5.2:1, in the natural clinoptilolite.

| | Concentration PPM (mg/kg) | | | | | | | | | | |
|---|---|---|---|---|---|---|---|---|---|---|---|
| | Na | Mg | Al | Si | P | K | Ca | Ti | Mn | Fe | Ba |
| Natural Clinoptilolite | 9083.01 | 4454.33 | 53138.6 | 278420 | 69.17 | 12449.7 | 17203.2 | 958.63 | 142.38 | 5484.94 | 1384.06 |
| S200 | 65707.8 | 6073.60 | 70451.7 | 193458 | 103.2 | 8760.17 | 22421.3 | 1299.64 | 196.01 | 8491.84 | 1594.92 |

Example 11

Elementary Study for Liquid Ion-Exchange Materials:

The liquid sample (S200L), prepared according to the procedure in Example 1, was analyzed by placing 5 mL of sample into a 100 mL Class A volumetric flask and made up to 100 mL by the addition of 2.0M nitric acid. Samples were run in triplicate. A procedural blank was also prepared and analyzed with samples.

The samples were analyzed using the instrumentation described below and the results are given below.

| | Concentration PPM (mg/L) | | | |
|---|---|---|---|---|
| | Na | Al | Si | K |
| S200L | 95265.3 | 552.3 | 24372.1 | 1848.6 |

For both solid and liquid sample preparations all acids used were purchased as the reagent grade and then double distilled using sub-boiling distillation units.

Instrumentation:

Trace element analysis was conducted using a Plasma Quad model PQ11 (Fisons Instruments, Beverly, Mass., USA) inductively coupled plasma-mass spectrometer.

Major element analysis was conducted using ICP-AES, Perkin Elmer model Optima 3300 XL ICP-OES (OES=Optical Emission Spectroscopy) (Perkin Elmer Instruments, Norwalk Conn., USA). The analysis on samples was carried out by external calibration and internal standardization procedure.

What was claimed is:

1. A method for removing heavy metals or radionuclides from an aqueous solution comprising contacting said aqueous solution with an ion exchange material selected from a liquid ion exchange material, or mixtures of a solid and a liquid ion exchange material, wherein said ion exchange material is prepared by the process comprising:
  (a) contacting clinoptilolite with an alkaline solution at a temperature of about 85° C. to about 300° C. and for a sufficient time to form a treated slurry comprising a solid fraction and a liquid fraction, and optionally
  (b) separating the solid fraction from said treated slurry and washing the solid fraction to produce said solid ion exchange material; and
  (c) recovering the liquid fraction of said treated slurry from step (b) to produce said liquid ion exchange material;
  wherein said alkaline solution comprises from about 10,000 mg/L to about 200,000 mg/L hydroxide ion; and
  wherein when a solid ion exchange material is used, said solid ion exchange material is the solid ion exchange material of step (b); when a liquid ion exchange material is used, said liquid ion exchange material is the liquid ion exchange material of step (c); and when a mixture of said solid ion exchange material and said liquid ion exchange material is used, said mixture can be said treated slurry produced in step (a) or said mixture can be prepared by mixing said solid ion exchange material of step (b) with said liquid ion exchange material of step (c).

2. The method of claim 1 wherein said aqueous solution is acidic.

3. The method of claim 2 wherein said liquid ion exchange material is contacted with an aqueous solution containing heavy metals and radionuclides for a sufficient period of time to precipitate contaminants from solution, and conducting a liquid/solid separation to remove the precipitated contaminants from the solution.

4. The method of claim 3 wherein the amount of said liquid ion exchange material contacted with said aqueous solution is sufficient to produce an aqueous solution having a pH after contacting with said liquid ion exchange material and removing precipitated contaminants of about 6 to about 9.

5. The method of claim 1 wherein said ion exchange material is a mixture of said solid ion exchange material and said liquid ion exchange material.

6. The method of claim 1 wherein said ion exchange material is a liquid ion exchange material.

7. A process for producing an ion exchange material useful for removing heavy metals or radionuclides from an aqueous solution comprising:
  (a) contacting clinoptilolite with an alkaline solution at a temperature of about 85° C. to about 300° C. and for a sufficient time to form a treated slurry comprising said ion exchange material comprising a solid fraction and a liquid fraction; and
  (b) separating the solid fraction from said treated slurry and washing the solid fraction to produce a solid ion exchange material; and
  (c) recovering the liquid fraction of said treated slurry from step (b) to produce a liquid ion exchange material;
  wherein said alkaline solution comprises from about 10,000 mg/L to about 200,000 mg/L hydroxide ion; and
  wherein said solid ion exchange material and said liquid ion exchange material is prepared by mixing said solid ion exchange material of step (b) with said liquid ion exchange material of step (c).

8. The process of claim 7 wherein said solid ion exchange material of step (b) is dried to produce a dried solid ion exchange material.

* * * * *